United States Patent [19]

Braukmann

[11] 4,231,548

[45] Nov. 4, 1980

[54] BALANCE VALVE DISC AND SEAT STRUCTURE

[75] Inventor: Heinz W. Braukmann, Willowdale, Canada

[73] Assignee: Braukmann Armaturen AG, Rothrist, Switzerland

[21] Appl. No.: 930,223

[22] Filed: Aug. 2, 1978

[51] Int. Cl.³ .............................................. F16K 39/02
[52] U.S. Cl. .................................. 251/282; 137/505.18
[58] Field of Search ............. 251/282; 137/514, 514.3, 137/505.18

[56] References Cited

U.S. PATENT DOCUMENTS

| | | | |
|---|---|---|---|
| 2,087,037 | 7/1937 | McCarthy | 251/282 |
| 2,622,613 | 12/1952 | McNeal | 137/514.3 |
| 3,011,521 | 12/1961 | Smith | 251/282 |
| 3,554,611 | 1/1971 | Kawabe et al. | 137/514.3 |
| 3,873,063 | 3/1975 | Illing | 251/282 |

FOREIGN PATENT DOCUMENTS 244923 12/1925 United Kingdom .................. 137/514.3

Primary Examiner—William R. Cline
Assistant Examiner—H. Jay Spiegel
Attorney, Agent, or Firm—William T. Howell

[57] ABSTRACT

A balanced valve disc and seat structure has a hollow valve disc engageable with the seat and pressure responsive means supported in the disc; the pressure responsive means divides the hollow valve disc into separate first and second chambers with a first aperture in the disc communicating with the first chamber and a second aperture in the disc communicating with the second chamber. A plunger has one end secured to the pressure responsive means with the other end of the plunger extending through the second chamber and the valve seat with means engaging the other end of the plunger when the first chamber has a higher pressure than the second chamber.

6 Claims, 3 Drawing Figures

BALANCE VALVE DISC AND SEAT STRUCTURE

FIELD OF INVENTION

This invention relates to valve structures wherein a valve disc, co-operating with a valve seat is balanced in order to eliminate the effect of varying pressure in the valve during operation of the valve disc in order that fluid can be withdrawn at a constant predetermined pressure. Balanced valves of this type are used particularly in pressure reducers.

PRIOR ART

Balanced valve structures have been developed because apart from inability to provide a consistent reduced pressure a non-balanced single seat valve has a reduced ability to perform as required when there are small pressure differences between initial and reduced pressures. Furthermore, a smaller valve seat, normally found on non-balanced single seat valves, is necessary to reduce the tendency to audible operation which is particularly objectionable in residential installations.

SUMMARY OF THE INVENTION

The balanced single valve of the invention has a hollow disc co-operating with a valve seat, with the interior of the disc supporting movable pressure responsive means such as a flexible diaphragm or a piston with a seal. The pressure responsive means divides the disc into a first and second chamber, each having apertures whereby the first chamber communicates with the inlet side of the valve and the second chamber communicates with the outlet side of the valve. The pressure responsive means is secured to one end of a plunger which extends through the second chamber and then through the valve seat, with means, such as a valve body, engaging the other end of the plunger when the first chamber has a higher pressure than the second chamber.

As a result of this arrangement, the pressure in the first chamber of the disc affects the pressure responsive means and not the disc; thus variations of pressure in the valve body have no effect on the disc and it takes the same minimum force to lift the valve disc from the seat in all circumstances.

DESCRIPTION OF THE PREFERRED EMBODIMENTS OF THE INVENTION

Figure 1:
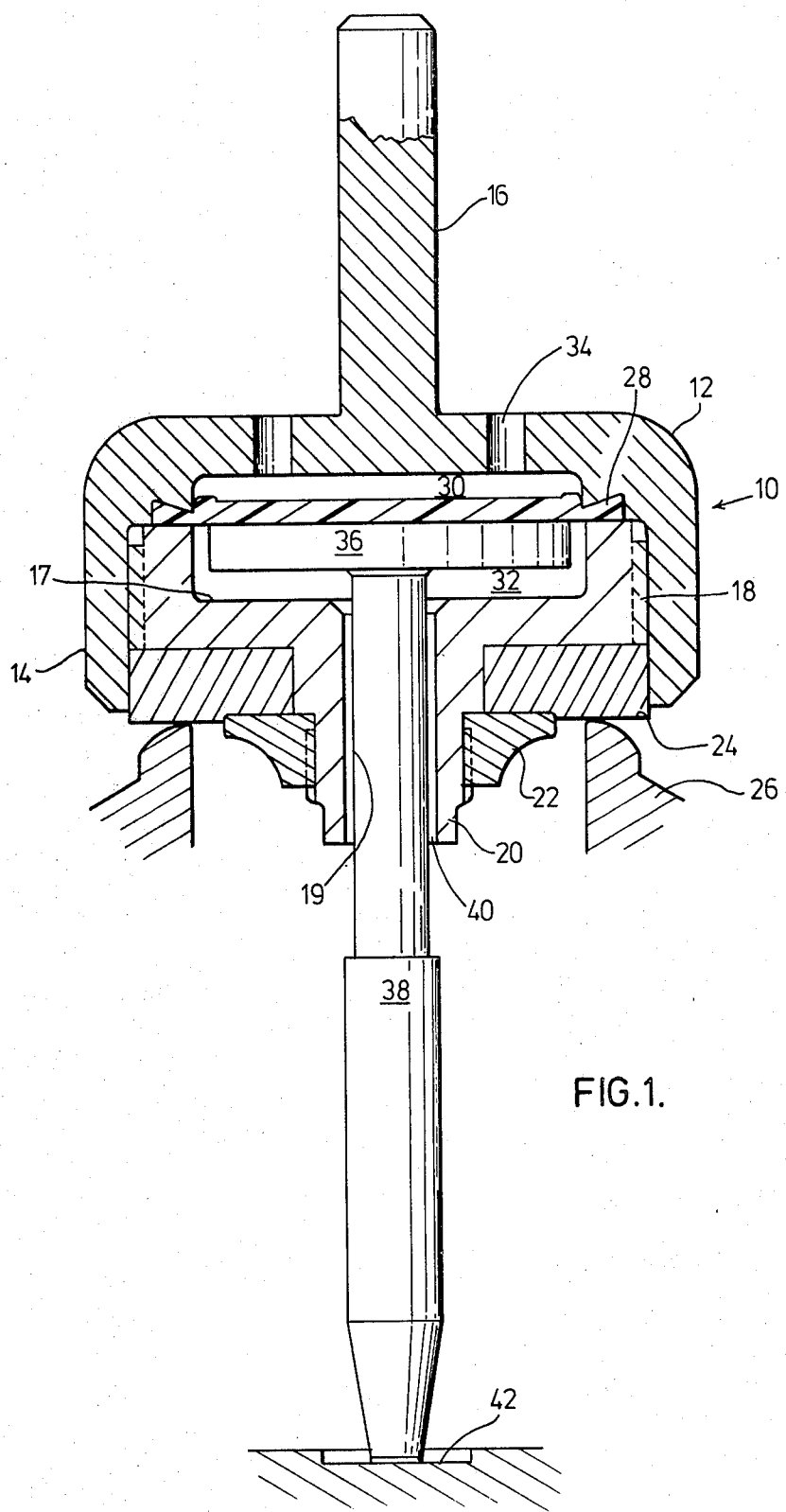
FIG. 1 is a cross section of one embodiment of a valve structure of the invention wherein the pressure responsive means in a single valve disc is a diaphragm.

With reference to FIG. 1, the embodiment of the valve structure of the invention shown therein has a hollow valve disc, generally denoted by the numeral 10, constructed of an inverted cup shaped member 12, having a side wall 14, which is internally threaded as shown. The base of the inverted cup shaped member 12 has a centrally disposed integral valve stem 16 extending upwards therefrom.

The valve disc stem also has a U shaped member 17 with an externally threaded side wall 18 which is in engagement with the threads of the side wall 14 of the cup shaped member 12. The base of the U shaped member 17 has an integral downwardly extending centrally disposed hollow boss 19 which has a stepped externally threaded portion 20. An internally threaded collar 22 is engageable on the stepped portion 20 of the boss 19. The collar 22 and the boss 19 support a resilient disc 24 which bears against the base of the U shaped member 17. The resilient disc 24 engages a valve seat 26 when the valve structure is in the closed position illustrated in FIG. 1.

A flexible diaphragm 28 is horizontally positioned in the hollow disc 10 and is held in place, as shown in FIG. 1, by peripheral engagement between the inverted cup shaped member 12 and the U shaped member 17 when they are threaded together. The flexible diaphragm 28 divides the hollow disc 10 into a first chamber 30 and a second chamber 32.

The inverted cup shaped member 12 has apertures 34 which provide for fluid pressure communication between the first chamber 30 and the upper side of the hollow disc 10, i.e. above the valve seat 26.

A plate 36 is secured to the underside of the flexible diaphragm 28 and the upper end of a plunger 38 is secured to the underside of the plate 36. The plunger 38 extends downwards through the second chamber 32 of the hollow disc 10 and then through the hollow boss 19 in spaced relationship therefrom, thereby forming an aperture 40 which provides for fluid pressure communication between the second chamber 32 and the lower side of the hollow disc 10, i.e. below the valve seat 26.

The lower end of the plunger 38 is engageable with stop means 42 when the pressure in the first chamber 30 is higher than the pressure in the second chamber 32.

Figure 2:
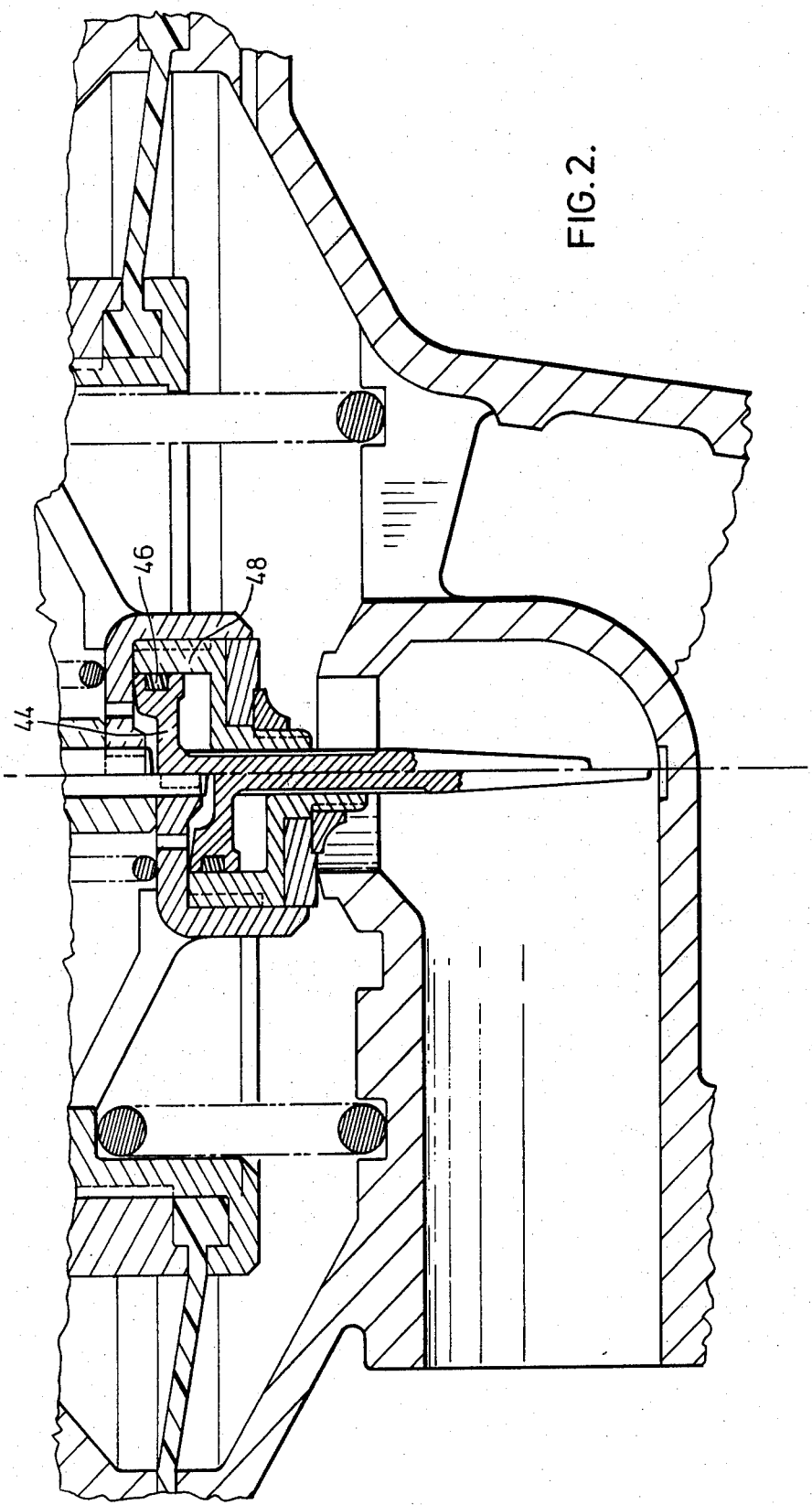
FIG. 2 is a cross section of another embodiment of a valve structure of the invention wherein the pressure responsive means in the single valve disc is a piston with a seal.

With reference to FIG. 2 the flexible diaphragm 28 is replaced by a piston 44 and seal 46 engageable with the internal side wall 48 of the hollow disc 10. Again when the pressure in the first chamber 30 is higher than the pressure in the second chamber 32, the pressure on the piston 44 is transmitted to the supported plunger 49 and removed from the disc 10.

Figure 3:
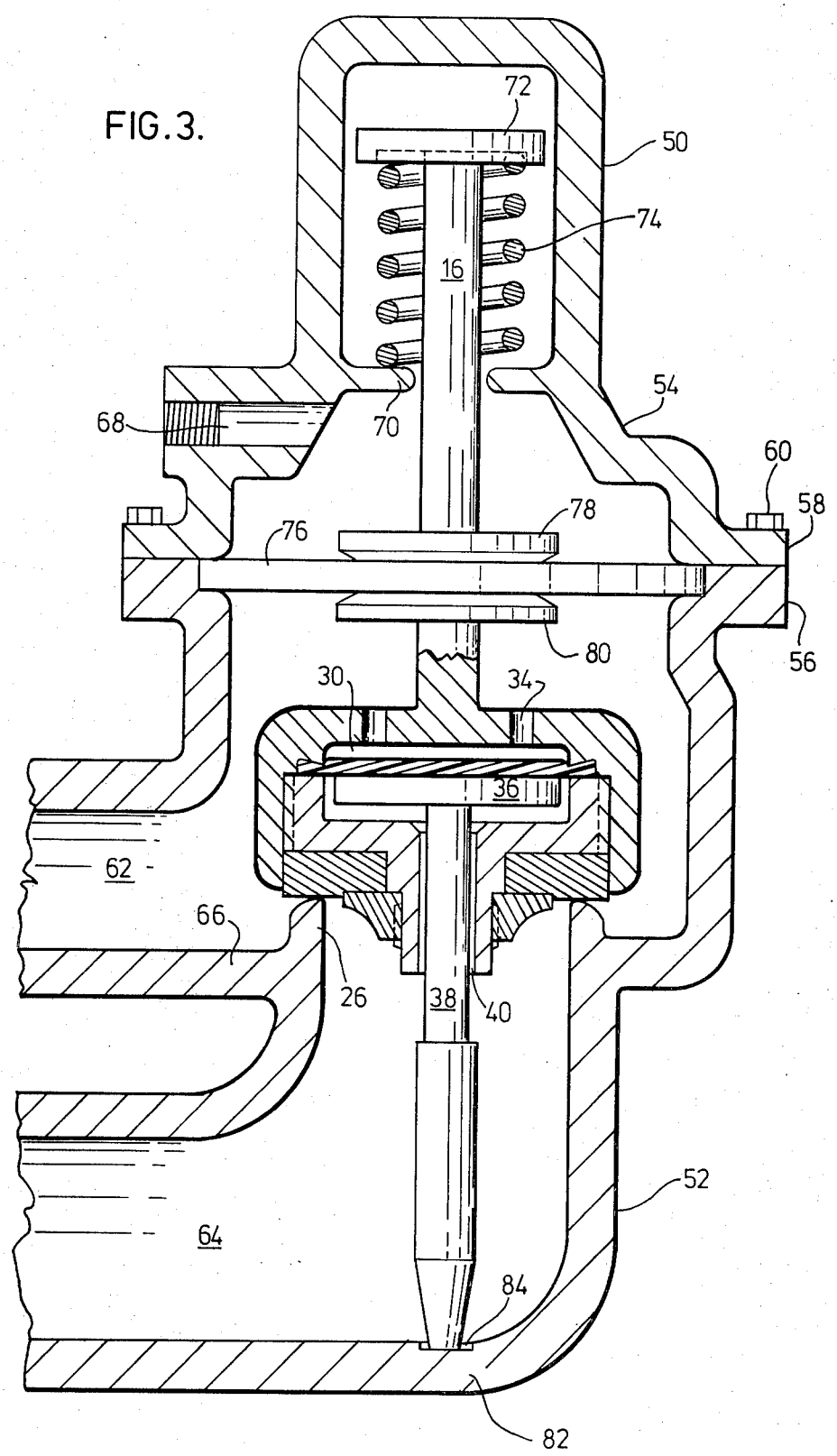
FIG. 3 is a cross section of a pressure reducing valve incorporating the valve structure shown in FIG. 1.

FIG. 3 shows how the valve structure of FIG. 1 may be incorporated into a pressure reducer which has a hollow valve body, generally denoted by the numeral 50, constructed of a lower portion 52 surmounted by a removable cap 54 sealingly secured together through flanges 56 and 58 respectively by cap screws 60. The lower portion 52 of the valve body 50 has an inlet 62 communicating with an outlet 64 when the hollow valve disc 10 is in the open position. The inlet 62 and the outlet 64 are separated by an integral annular inner wall 66 to valve body 10 with the inner wall 66 conveniently forming the valve seat 26.

The upper removable cap 54 has a pressure inlet 68 positioned below another annular wall 70 which is traversed by the valve stem 16, the latter terminating in an integral shoulder 72. One end of a helical spring 74 bears against the underside of the shoulder 72 and the other end of the spring 74 bears against the upper side of the annular wall 70. An annular diaphragm 76 is secured at its periphery by the flanges 56 and 58; the diaphragm 76 is secured to valve stem 16 by opposed plates 78 and 80.

The lower wall 82 of the valve body 50 is preferably grooved as at 84 to provide for location of the lower end of the plunger 28. The lower wall 82 acts as a stop means for the plunger 28 when the pressure in the first chamber 30 is higher than the pressure in the second chamber 32 of the valve disc 10. As a result the pressure necessary to lift the hollow valve disc 10 is minimally the same despite variations in the inlet pressure.

I claim:

1. A balanced valve disc and seat structure having a hollow valve disc engageable with said seat, pressure responsive means supported in said disc, said pressure responsive means dividing said hollow valve disc into separate first and second chambers, a first aperture in said disc communicating with said first chamber, a second aperture in said disc communicating with said second chamber, a plunger having one end secured to said pressure responsive means, the other end of said plunger extending through said second chamber and said valve seat and means engaging said other end of said plunger when said first chamber has a higher pressure than said second chamber.

2. A balanced valve disc and seat structure according to claim 1 wherein said pressure responsive means is a diaphragm.

3. A balanced valve disc and seat structure according to claim 1 wherein said pressure responsive means is a piston with a seal engageable with the interior wall of said hollow valve disc.

4. A balanced valve disc and seat structure according to claim 1 wherein said hollow valve disc is constructed of a pair of cup shaped members with one threaded into the other.

5. A balanced valve disc and seat structure according to claim 4 wherein said pressure responsive means is a diaphragm held between said pair of cup shaped members.

6. A balanced valve disc and seat structure according to claim 4 wherein said pressure responsive means is a piston with a seal engageable with the inner wall formed by said pair of cup shaped members in threaded engagement.

* * * * *